(12) United States Patent
Hayotte

(10) Patent No.: US 6,347,836 B1
(45) Date of Patent: Feb. 19, 2002

(54) AUTOMOBILE SEAT BACK STRUCTURE ARTICULATED AROUND FITTED PIVOTS

(75) Inventor: Sébastien Hayotte, Puteaux (FR)

(73) Assignee: Bertrand Faure Equipments SA, Boulogne (FR)

( * ) Notice: Subject to any disclaimer, the term of this patent is extended or adjusted under 35 U.S.C. 154(b) by 0 days.

(21) Appl. No.: 09/569,011

(22) Filed: May 11, 2000

(30) Foreign Application Priority Data

May 18, 1999 (FR) .............................................. 99 06282

(51) Int. Cl.⁷ ................................................. B60N 2/68
(52) U.S. Cl. .................................. 297/452.2; 297/378.1
(58) Field of Search ......................... 297/452.18, 452.2, 297/378.1

(56) References Cited

U.S. PATENT DOCUMENTS

| | | | |
|---|---|---|---|
| 3,759,572 A | 9/1973 | Koepke | 297/452 |
| 5,269,589 A | 12/1993 | Brothers et al. | 297/440.16 |
| 5,464,273 A * | 11/1995 | Makoto | 297/452.18 X |
| 5,575,533 A * | 11/1996 | Glance | 297/452.2 |
| 5,664,839 A | 9/1997 | Pedronno et al. | 297/378.13 |
| 5,676,423 A * | 10/1997 | Pedronno et al. | 297/378.1 |
| 5,826,944 A | 10/1998 | Beneker et al. | 297/440.2 |
| 6,048,033 A * | 4/2000 | Sakurai et al. | 297/452.18 |

FOREIGN PATENT DOCUMENTS

| | | |
|---|---|---|
| EP | 0 233 822 | 8/1987 |
| EP | 0 581 648 | 2/1994 |
| EP | 0 681 940 | 11/1995 |

* cited by examiner

Primary Examiner—Peter R. Brown
(74) Attorney, Agent, or Firm—Marshall, Gerstein & Borun

(57) ABSTRACT

A seat back structure comprises a lower edge around which it is articulated and next to which is fixed a lower crosspiece the ends of which have pivoting means. These pivoting means are carried by a base which is itself added by fitting in the ends of the lower crosspiece.

6 Claims, 2 Drawing Sheets

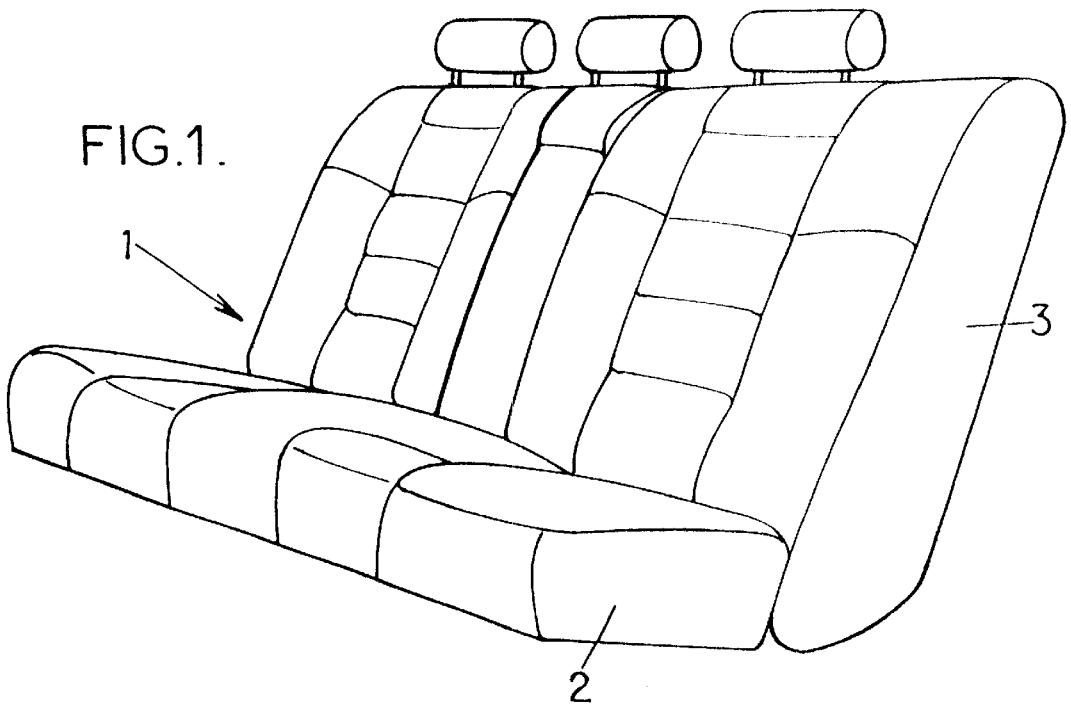
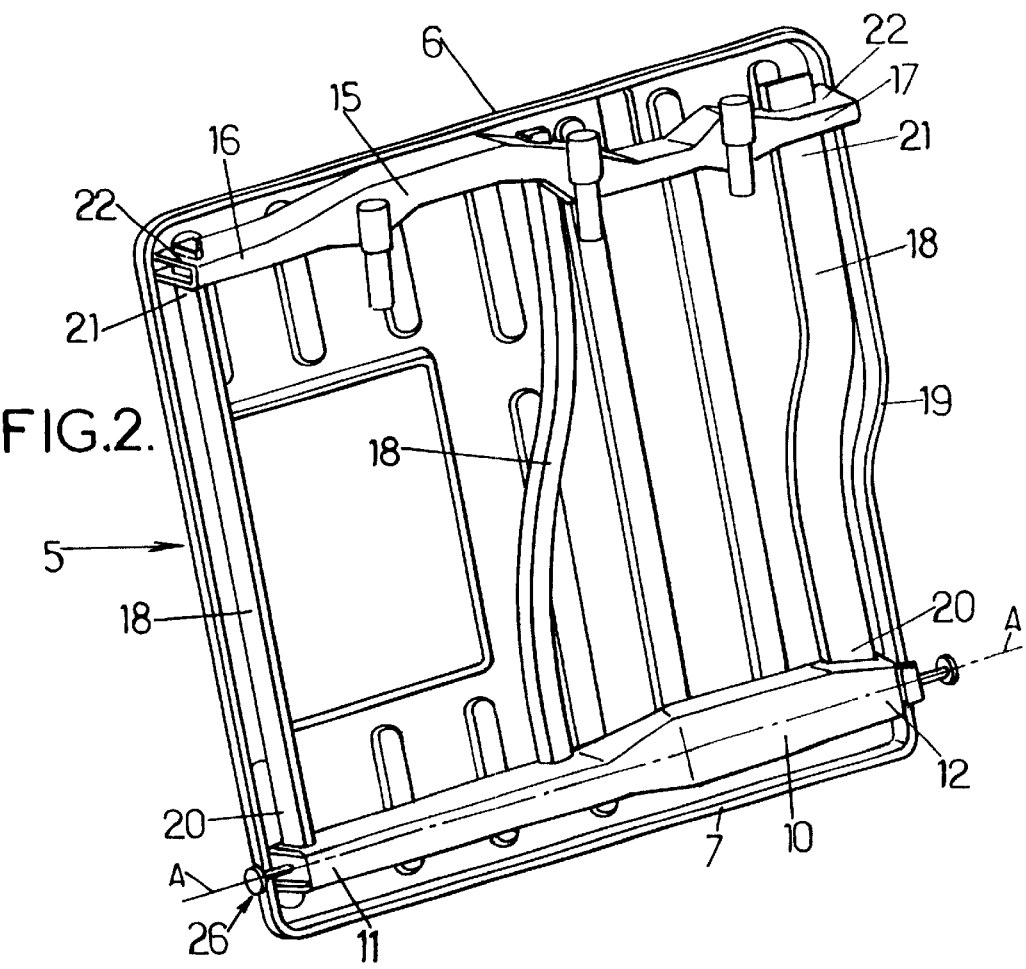

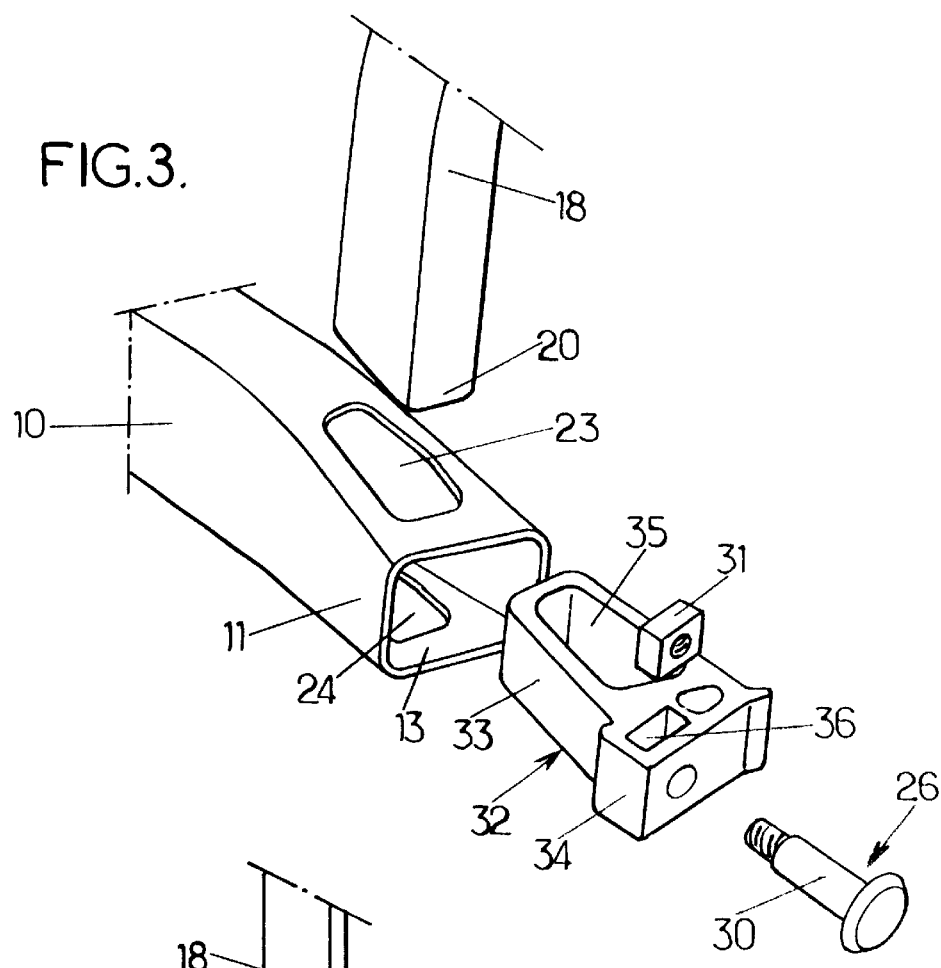
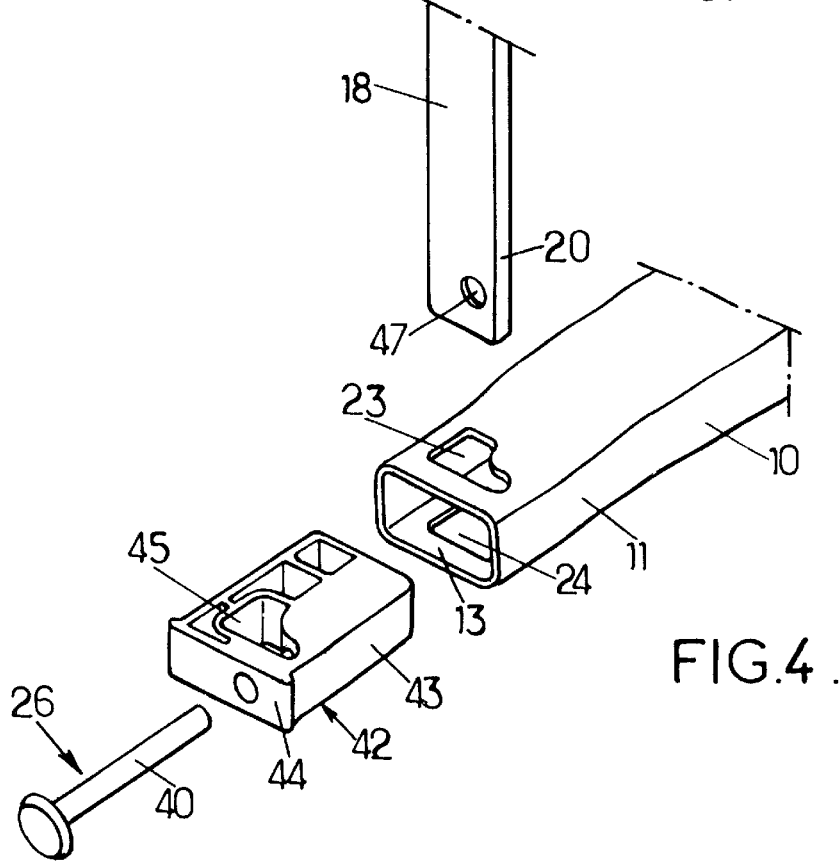

AUTOMOBILE SEAT BACK STRUCTURE ARTICULATED AROUND FITTED PIVOTS

FIELD OF THE INVENTION

The present invention relates to a seat back structure for a vehicle and more particularly to a rear seat back structure also called a bench seat.

Such back structures currently extend between an upper edge and a lower edge and comprise:

a rigid lower crosspiece which is next to the lower edge of the structure and has two ends;

at least first and second approximately vertical rigid uprights which each extend between an upper end and a lower end, the lower ends of the uprights being fixed to the lower crosspiece; and pivoting means which are next to the lower edge so that the structure rotates around the lower edge between an upright position and a folded down position.

BACKGROUND OF THE INVENTION

The pivoting means usually take the form of pivot pins which are connected to the structure either by welding, or by screwing onto parts themselves added by welding onto the structure. In order to control the stresses of the pivot pins, this technique has the disadvantage of requiring a good quality of welding, sometimes tricky to achieve. Furthermore, even if the welds are correctly carried out, the welding operation affects the characteristics of the structure material, particularly when this structure is in aluminium. The mechanical resistance of the structure is thus reduced.

OBJECTS AND SUMMARY OF THE INVENTION

The object of the invention is to remedy the above disadvantages by supplying a structure the pivot pins of which are fixed without weakening the mechanical characteristics of the structure and this, by simple, efficient and inexpensive means.

To this end, according to the invention, the pivoting means are carried by two bases which are each added by fitting in the tubular ends of the lower crosspiece, and each of the vertical uprights is fixed by fitting at the same time in the bases and in the lower crosspiece.

Thanks to these arrangements, the assembly of the pivoting means, such as pivot pins, is obtained without welding. The stresses undergone by the pivots are transmitted to the structure without passing through welded connections. The mechanical resistance of the back structure is thus not affected.

The structure according to the invention can possibly comprise moreover one or more of the following characteristics:

the ends of the lower crosspiece are of tubular shape delimiting a housing, the base comprises a main section which is of complementary shape to that of the housing in which it is fitted and which is provided with a recess, two opposite windows being made in each of the ends of the lower crosspiece, the recesses and the two windows being of complementary shape to that of the lower ends of the vertical uprights;

the lower crosspiece and the uprights are made in aluminium, and the pivoting means are made in steel;

the pivoting means comprise two pivots which are at least in part threaded and which project beyond the ends of the lower crosspiece from the bases;

two nuts are each immobilised in a cage made in the end of each base and the pivots are screwed in the nuts; and the main section of each base is tapped and a drilling is made in the lower end of each upright, the pivots being screwed in the bases, passing through the drillings.

BRIEF DESCRIPTION OF THE DRAWINGS

Two version examples of the invention will now be described with reference to the appended drawings, in which:

FIG. 1 is a perspective view of a seat the back of which is fitted with a structure according to the invention;

FIG. 2 is a perspective view of the back structure of the seat of FIG. 1;

FIG. 3 is an exploded perspective view of a first version of the assembly of the pivoting means of the structure of FIG. 2; and FIG. 4 is an exploded perspective view of a second version of the assembly of the pivoting means of the structure of FIG. 2.

MORE DETAILED DESCRIPTION

On the different figures, the same references designate identical or similar components.

FIG. 1 shows an automobile vehicle seat 1 including a seat part 2 and a back 3 which can pivot to the front or to the rear of the seat between an upright position (such as that shown) and a folded down position. The seat 1 is for example a rear bench seat of an automobile vehicle.

In a known way, the bench seat 1 extends transversely to the vehicle which carries it, over approximately all its width.

The back 3 comprises a rigid metal frame 5 which is seen in perspective in FIG. 2. This structure extends between an upper edge 6 next to the top of the back 3 and a lower edge 7 next to the floor of the vehicle (not shown) which carries the bench seat.

The metal structure 5 of the back 3 comprises:

a rigid lower horizontal crosspiece 10 which extends over the whole width of the back, next to the lower edge 7. This crosspiece is of tubular shape and has two open ends 11 and 12 which each delimit a housing 13 (FIGS. 3 and 4);

a rigid horizontal upper crosspiece 15 which also extends over the whole width of the back, between two ends 16 and 17. This crosspiece extends next to the upper edge 6 and is also of tubular shape;

three uprights 18 which extend vertically between the lower 10 and upper 15 crosspieces. Two of these uprights 18, called hereafter side uprights, are located at the ends 11, 12, 16, 17 of these crosspieces whereas the third upright 18 or central upright is placed approximately at mid width of the structure; and a reinforcing plate 19 which covers all the surface defined by the crosspieces 10, 15 and the uprights 18.

The whole of the aforementioned constituent parts of the frame 5 is for example made in aluminium.

Each upright 18 extends vertically between a lower end 20 and an upper end 21. The upper ends 21 of the side uprights 18 are fitted without play in two recesses 22 respectively made in the ends 16, 17 of the upper crosspiece 15 whereas the lower ends 20 of these uprights are fitted without play in two windows 23 respectively made in the ends 11, 12 of the lower crosspiece 10.

The lower ends 20 of the side uprights 18 pass through the ends 11,12 of the lower crosspiece 10 so that two additional windows 24 are made in the ends 11, 12, opposite the windows 23.

The windows 23, 24 emerge in the housings 13 and are of complementary shape to the transverse section of the side uprights 18.

In the first version and the second version respectively shown in FIGS. 3 and 4, the uprights 18 are respectively of tubular shape and of flat shape.

In each of the two versions, the structure 5 is pivoting mounted between the upright and folded down positions around pivoting means 26 which define a transverse horizontal pivoting axis A—A passing through the lower crosspiece 10.

The pivoting means 26 consist, in the first version, of two pivot pins 30 immobilised by two nuts 31 in two rigid blocks called hereafter bases 32, which are each added by fitting in the open ends 11, 12 of the lower crosspiece 10. The pivot pins are made by preference in steel, and the bases 32 can be made for example in aluminium or in steel.

Each base 32 comprises a main section 33 and a solid end 34. When the base 32 is fitted in the housing 13, the main section 33 penetrates into this housing and the end 34 closes the housing 30 by immobilising the base in it.

The main section 33 comprises a recess 35 of complementary shape to the transverse section of the lower end 20 of the vertical upright 18 in order that this, after fitting the base 32, passes through the windows 23, 24 of the lower crosspiece 10 and the recess 35 at the same time.

The pivot pin 30 is partially screwed in the end 34 of the base 32 by means of the nut 31 housed in a cage 36 itself made in the solid end 34. When the base 32 is fitted in the crosspiece 10, the pivot pin 30 projects from the end of it so as to engage with complementary means carried by the vehicle.

Thus, the pivot pins 30 are immobilized on parts, the bases 32, which are immobilized by fitting on the structure 5. Only the uprights 18 are welded onto the lower crosspiece 10 after having been fitted in it and in the bases 32. They serve therefore as pins to avoid welding the pivot pins 30.

The pivoting means 26 of the second version shown in FIG. 4 comprise two pivot pins 40 which are threaded over a large part of their length in order to be screwed in the bases 42. These are, like the bases 32 of the first version, added by fitting into the ends 11, 12 of the lower crosspiece 10, and each include a main section 43 and an end 44. The main section 43 has a recess 45 in which the lower end 20 of the upright 18 penetrates.

The end 20 of the upright 18 comprises a drilling 47 and the base 42 is tapped from its end 44 as far as the main section 43, beyond the recess 45, so that, after fitting the upright, the lower crosspiece and the base, the pivot pin 40 is screwed in the base 42 by passing through the drilling 47. Thus, not only does the pivot pin not weaken the structure in so far as it is not welded, but it reinforces it since it contributes to the mounting of the constituent parts of this structure.

I claim:

1. A seat back structure for a vehicle extending between an upper edge and a lower edge, the structure comprising:

a rigid lower horizontal tubular crosspiece which is near the lower edge of the structure and which has two ends;

at least first and second approximately vertical rigid uprights which each extend between an upper end and a lower end, the lower ends of the uprights being fixed to the lower crosspiece; and pivoting means which are next to the lower edge with the result that the structure rotates around the lower edge between an upright position and a folded down position, wherein the pivoting means are carried by two bases which are each added by fitting into the tubular ends of the lower crosspiece, and wherein each of the vertical uprights is fixed by fitting into the bases and in the lower crosspiece at the same time.

2. A back structure according to claim 1, wherein the ends of the lower crosspiece are of tubular shape delimiting a housing, the base includes a main section which is of complementary shape to that of the housing in which it is fitted and which is provided with a recess, two opposite windows being made in each of the ends of the lower crosspiece, the recesses and the two windows being of complementary shape to that of the lower ends of the vertical uprights.

3. A back structure according to claim 2, wherein the lower crosspiece and the uprights are made of aluminium, and the pivoting means are made of steel.

4. A back structure according to claim 3, wherein the pivoting means comprise two pivot pins which are at least in part threaded and which project beyond the ends of the lower crosspiece from the bases.

5. A back structure according to claim 4, wherein two nuts are each immobilised in a cage made in the end of each base and the pivot pins are screwed in the nuts.

6. A back structure according to claim 4, wherein the main section of each base is tapped and a hole is made in the lower end of each upright, the pivot pins being screwed into the bases and passed through the holes.

* * * * *